United States Patent
Heggelund et al.

(10) Patent No.: US 9,256,975 B2
(45) Date of Patent: Feb. 9, 2016

(54) GRAPHICS PROCESSING SYSTEMS

(75) Inventors: Frode Heggelund, Trondheim (NO);
Oystein Gjermundnes, Trondheim (NO)

(73) Assignee: ARM LIMITED, Cambridge (GB)

( * ) Notice: Subject to any disclaimer, the term of this patent is extended or adjusted under 35 U.S.C. 154(b) by 768 days.

(21) Appl. No.: 12/969,455

(22) Filed: Dec. 15, 2010

(65) Prior Publication Data

US 2011/0148919 A1   Jun. 23, 2011

(30) Foreign Application Priority Data

Dec. 17, 2009   (GB) .................................. 0922126.8

(51) Int. Cl.
  *G06T 1/00*   (2006.01)
  *G06T 15/00*  (2011.01)
  *G06T 1/20*   (2006.01)

(52) U.S. Cl.
  CPC ................. *G06T 15/005* (2013.01); *G06T 1/20* (2013.01)

(58) Field of Classification Search
  CPC ......... G09G 5/363; G09G 5/395; G09G 5/39; G09G 5/393; G06T 1/60; G06T 15/005; G06T 1/20; G06T 11/40
  USPC ........................................................ 345/501
  See application file for complete search history.

(56) References Cited

U.S. PATENT DOCUMENTS

| | | |
|---|---|---|
| 6,252,610 B1 | 6/2001 | Hussain |
| 7,023,437 B1 | 4/2006 | Voorhies |
| 2005/0225670 A1* | 10/2005 | Wexler et al. ................. 348/441 |

FOREIGN PATENT DOCUMENTS

| | | |
|---|---|---|
| CN | 101080698 A | 11/2007 |
| CN | 101114381 A | 1/2008 |
| GB | 2343598 | 5/2000 |
| GB | 2420679 | 5/2006 |
| WO | WO2009/068895 | 6/2009 |

OTHER PUBLICATIONS

UK Search Report dated Apr. 19, 2010; UK Application No. GB0922126.8.

(Continued)

*Primary Examiner* — Xiao Wu
*Assistant Examiner* — Scott E Sonners
(74) *Attorney, Agent, or Firm* — Vierra Magen Marcus LLP

(57) ABSTRACT

An "accumulation buffer" process in a graphics processing system is carried out not by rendering each sub-frame making up the accumulated frame in its entirety in turn, but by subjecting each individual tile 2, 3, 4 and 5 making up the accumulated frame to the sequence of different rendering passes individually. Thus, for each individual tile making up the accumulated frame, several sub-tiles (e.g. 2', 2", 2''' and 2'''') are generated in turn and accumulated together to provide a final accumulation tile ($2_{ACC}$) that is output as the accumulated version of the tile in question. This is then repeated for each of the remaining individual tiles 3, 4 and 5 making up the accumulated frame 1, and the individual accumulated tiles $2_{ACC}$, $3_{ACC}$, $4_{ACC}$ and $5_{ACC}$ are combined together to provide the output accumulated frame 6.

20 Claims, 6 Drawing Sheets

(56) References Cited

OTHER PUBLICATIONS

Nishita, Method of Displaying Optical Effects within Water using Accumulation Buffer, SIGGRAPH '94, Jul. 24-29, 1994, Orlando, Florida.

Haeberli, "The Accumulation Buffer: Hardware Support for High-Quality Rendering," Computer Graphics, vol. 24, No. 4, Aug. 1990, pp. 309-318.

UK Search Report and Combined Search and Examination Report dated May 31, 2011; UK Application No. GB1021574.7.

Office Action dated Mar. 3, 2014 in Chinese Patent Application No. 201010593924.9, 19 pages.

English Abstract of Chinese Patent Application No. CN101080698A published Nov. 28, 2007, 1 page.

English Abstract of Chinese Patent Application No. CN101114381A published Jan. 30, 2008, 1 page.

Office Action dated Oct. 22, 2014 in Chinese Patent Application No. 201010593924.9, 20 pages.

Office Action dated Jun. 18, 2015 with English translation in Chinese Patent Application No. CN201010593924.9, 12 pages.

* cited by examiner

GRAPHICS PROCESSING SYSTEMS

BACKGROUND

1. Field

The technology described herein relates to graphics processing systems and in particular to the so-called "accumulation buffer" operation in graphics processing systems.

2. Description of the Related Art

As is known in the art, there is a process in graphics processing that is commonly referred to as the "accumulation buffer". This process is a well-known feature that is, for example, part of the desktop Open GL standard.

The "accumulation buffer" process basically involves rendering several different versions of a "frame", e.g. from several different viewing angles, and accumulating a desired weighted average of all the different rendered versions of the frame in a single buffer (the "accumulation buffer"). This resulting "accumulation buffer" averaged version of the different frames is then used as the output frame (e.g., and typically, as the frame to be displayed).

The "accumulation buffer" is typically used to emulate a number of different effects, such as depth of field, motion blur, soft shadows and anti-aliasing.

One drawback with the use of the accumulation buffer is that in existing implementations, it requires the use of an external (to the graphics processor) full-frame floating point buffer to act as the accumulation buffer. While this may be acceptable in the case of more powerful desktop graphics processing systems, the Applicants have recognised that such an arrangement is not desirable in lower-powered graphics processing systems, such as embedded graphics processing systems and/or systems for use in portable devices. Indeed, for this and other reasons, the Open GLES standard, for example, does not include the use of accumulation buffers.

The Applicants believe therefore that there remains scope for improvements to accumulation buffer operation and implementation in graphics processing systems.

DETAILED DESCRIPTION

Figure 1A:
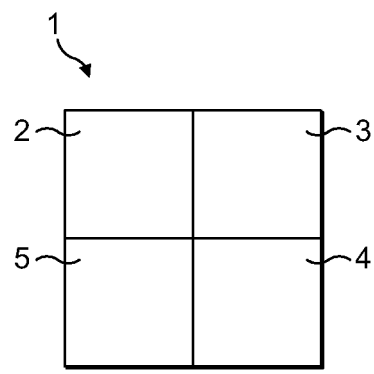
FIG. 1 shows schematically the operation of one embodiment.

According to a first aspect, there is provided a method of providing the accumulated results of several rendering passes for a frame as an output frame in a tile-based graphics processing system, the method comprising:

performing the several rendering passes and accumulating the results of those rendering passes for each tile that the output frame is to be divided into individually, so as to generate for each tile an output tile that comprises the accumulated results of the rendering passes for the tile, and such that all of the rendering passes and the accumulation of the results of those rendering passes is completed at least for one tile before the process is started for other tiles; and combining the so-generated output tiles to provide the output frame comprising the accumulated results of the several rendering passes for the frame.

According to a second aspect, there is provided a tile-based graphics processing system comprising:

means for performing several rendering passes and accumulating the results of those rendering passes for each tile that an output frame is to be divided into individually so as to generate for each tile an output tile that comprises the accumulated results of the rendering passes for the tile, and such that all of the rendering passes and the accumulation of the results of those rendering passes is completed at least for one tile before the process is started for other tiles; and means for combining the so-generated output tiles to provide an output frame comprising the accumulated results of the several rendering passes for each tile.

According to a third aspect, there is provided a method of operating a tile-based graphics processing system, comprising:

the graphics processing system:

performing for a first tile or set of plural tiles of a frame to be output a plurality of rendering passes on the tile or on each tile of the set individually and accumulating the results of those rendering passes for the respective tile or for each respective tile to provide for the tile or for each tile of the set of tiles a tile output representing the accumulated results of the plurality of rendering passes for the tile; and outputting the accumulated tile output for the tile or for each tile of the set of tiles to an output render target, preferably to a frame buffer; and thereafter:

performing for a second tile or set of plural tiles of the frame to be output the plurality of rendering passes on the tile or on each tile of the set individually and accumulating the results of those rendering passes for the respective tile or for each respective tile to provide for the second tile or for each tile of the second set of tiles a tile output representing the accumulated results of the plurality of rendering passes for the tile; and outputting the accumulated tile output for the second tile or for each tile of the second set of tiles to the output render target, preferably to the frame buffer; and repeating this process for the remaining tiles of the output frame;

whereby:

an output frame comprising the accumulated results of several rendering passes for the output frame is generated by performing the several rendering passes and accumulating the results of those rendering passes on a tile-by-tile basis.

According to a fourth aspect, there is provided a tile-based graphics processing system, comprising:

means for:

performing for a first tile or set of plural tiles of a frame to be output a plurality of rendering passes on the tile or on each tile of the set individually and accumulating the results of those rendering passes for the respective tile or for each respective tile to provide for the tile or for each tile of the set of tiles a tile output representing the accumulated results of the plurality of rendering passes for the tile; and for outputting the accumulated tile output for the tile or for each tile of the set of tiles to an output render target, preferably to a frame buffer; and means for thereafter:

performing for a second tile or set of plural tiles of the frame to be output the plurality of rendering passes on the tile or on each tile of the set individually and accumulating the results of those rendering passes for the respective tile or for each respective tile to provide for the second tile or for each tile of the second set of tiles a tile output representing the accumulated results of the plurality of rendering passes for the tile; and for outputting the accumulated tile output for the second tile or for each tile of the second set of tiles to the output render target, preferably to the frame buffer; and means for repeating this process for the remaining tiles of the output frame;

whereby:

an output frame for display comprising the accumulated results of several rendering passes for the output frame is generated by performing the several rendering passes and accumulating the results of those rendering passes on a tile-by-tile basis.

The technology described herein relates to the provision of an output frame that is the accumulated results of a plurality of rendering passes for the frame, i.e. to "accumulation buffer" operation, as discussed above.

However, rather than generating the "accumulated" output frame by rendering whole frames multiple times one after another and accumulating the results, in the technology described herein the accumulation operation is carried out on a tile-by-tile basis, and then the so "accumulated" tiles combined to provide the output "accumulated" frame. In other words, the multiple rendering passes and the accumulation of their results is performed for each tile individually and the results for each individual tile then combined to provide the output "accumulation frame" (e.g. that is to be displayed).

Thus, the technology described herein operates by, for a given tile, subjecting that tile to multiple rendering passes in succession, and accumulating the result of those rendering passes in an appropriate (and desired) fashion for the tile individually.

In effect therefore, if one considers that in a traditional accumulation buffer implementation, a given rendering pass is performed across an entire frame (i.e. for all the tiles of the frame) to generate a given "sub-frame" before the next "sub-frame" is begun (before then subjecting an entire frame to the next rendering pass), the rendering order in the technology described herein is instead such that the sequence of rendering passes will first be performed one after another on a given tile (or tiles of a set of tiles) (rather than across all the tiles of a frame), before the system moves on to the next tile (or set of tiles) and performs the sequence of rendering passes on that tile (or the tiles of that set of tiles), and so on. Thus, in effect, each "sub-tile" for a given tile (or set of tiles) will be rendered (and accumulated) before another tile (or set of tiles) is begun.

Thus, in particular, in the technology described herein, as set out above, the rendering passes and the accumulation of the results of those rendering passes is completed at least for one tile (and preferably at least for some of the tiles (i.e. for plural tiles)) before the process is started for other tiles of the output frame. In other words, in the technology described herein, the accumulation process is finished for one (or more) tiles before going on to other tiles, rather than processing each entire frame as a whole.

Similarly, whereas in traditional accumulation buffer operation, the final output, accumulated, frame consists of the accumulation of several sub-frames that together contribute to the final output frame, the technology described herein can be looked on as processing for a given tile, several sub-tiles, which are accumulated together to provide a final output, accumulated, tile (that is then output to the frame buffer and combined with the output, accumulated, tile for each of the other tiles of the frame to give the overall output frame).

The Applicants have recognised that the arrangement of the technology described herein can confer a number of advantages.

Firstly, because the accumulation operation is performed in respect of individual tiles, that removes the need to have a full-frame "accumulation" buffer for the "accumulation buffer" operation.

Moreover, as will be discussed further below, the technology described herein allows the accumulation process to be implemented using buffers on the graphics processor itself (such as, and preferably, the tile-buffers that will be present in any event). This then removes the need for any external memory (and external memory accesses) as part of the accumulation buffer process. This can then provide a significant saving in terms of the elimination of external memory bandwidth for accumulation buffer operation. This may lead, for example, to significant power usage savings and to increased rendering speeds as compared to traditional accumulator buffer implementations that use external accumulation buffers.

Indeed, the Applicants believe that the technology described herein makes it possible to efficiently implement accumulation buffer operations on lower-powered graphics processing systems, such as in portable devices, in contrast to traditional accumulation buffer implementations. Moreover, facilitating the use of the accumulation buffer process in lower-powered, e.g. portable devices, will allow a significant graphics performance increase in such devices.

As discussed above, the technology described herein is intended to be implemented in a tile-based graphics processing system.

As is known in the art, in tile based rendering, the two dimensional output array or frame of the rendering process (the "render target") (e.g., and typically, that will be displayed to display the scene being rendered) is sub divided or partitioned into a plurality of smaller areas or sub-regions, usually referred to as "tiles", for the rendering process. The tiles (sub-regions) are each rendered separately (typically one after another). The rendered tiles (sub-regions) are then recombined to provide the complete output array (frame) (render target), e.g. for display.

The tiles can therefore be thought of as the sub-divisions of the render target area (output frame) that the rendering process operates on. In such arrangements, the render target area (output frame) is typically divided into regularly sized and shaped tiles (they are usually e.g., squares or rectangles) but this is not essential.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.

The tiles that the render target (the output frame) is divided into for rendering purposes in the technology described herein can be any desired and suitable size or shape. The tiles are preferably all the same size and shape, as is shown in the art, although this is not essential. In one embodiment, each tile is rectangular, and preferably 16×16, 32×32 or 16×8 sampling positions in size.

It should also be noted here that while in one embodiment the tiles that the frame is divided into for the purposes of the technology described herein are the same as or similar to the tiles that the rendering process will operate on in its "normal" rendering operation, the technology described herein may be performed using tiles of a different size and/or shape to the "normal" rendering tiles if desired. For example, the "tiles"

that the "accumulation buffer" process of the technology described herein operates on may comprise plural "rendering tiles" or a sub-region of a "rendering tile", if desired.

As discussed above, an important feature of the technology described herein is that the multiple rendering passes and the accumulation of the results of these rendering passes is performed on a tile-by-tile basis, rather than by performing each rendering pass across a whole frame before the next rendering pass is begun. In other words, a given tile will be subjected to the multiple rendering passes whose results are to be accumulated one-after-another in immediate succession, rather than, e.g. waiting for a given rendering pass to be performed for all the tiles (for a whole frame) before the next rendering pass for that particular tile is performed.

Thus, for a given tile being processed, the next rendering pass for that tile will be begun once the preceding rending pass for that tile has finished, rather than waiting for the preceding rendering pass to be completed for all other tiles before beginning the next rendering pass for the tile in question. (The effect of this will be that, as discussed above, during the process of generating the output frame, the rendering passes and accumulation for at least one of the tiles will be completed before the rendering passes and accumulation is begun for at least one other tile (in practice the rendering and accumulation process will be completed for some, and typically many, of the tiles before it is begun for others of the tiles).)

Most preferably, the next rendering pass for a given tile being processed is begun immediately the preceding rendering pass for that tile has finished. However, this is not essential, and it would, e.g., as discussed below, be possible to process plural tiles in parallel, and/or to interleave the processing of different tiles. In this case it may be that another tile will be subject to a rendering pass before the next rendering pass for a given tile is begun (but it will still be the case that one or more tiles are completed before other tiles are begun).

Most preferably, one tile (or set of tiles) is processed to completion (to provide its final accumulated output) before the next tile (or set of tiles) is begun. Similarly, preferably processing of an unprocessed tile (or set of tiles) is not started until a tile (or set of tiles) that is currently being processed has been completely finished (the next tile (or set of tiles) is not begun until a previous tile (or set of tiles) has been processed to completion). (Again, as noted above, in an alternative arrangement it would be possible to start the next tile/set of tiles before the previous tile/set of tiles has finished, if desired.)

In one embodiment, each tile is processed singly, in turn, i.e. the tiles undergo all the multiple rendering passes and accumulation process one-after-another in turn. In this case each individual tile will preferably be completed (fully accumulated) before the next tile is begun.

In another embodiment, plural tiles (a set of plural tiles) can and preferably do undergo the rendering and accumulation process simultaneously. For example, and preferably, two tiles may undergo the processing in the manner of the technology described herein simultaneously. For example, the processing of the two tiles may be interleaved.

In these cases, the tiles making up the output, accumulated, frame can effectively be considered to be being processed in sets of tiles (as discussed above), each set comprising two or more (and preferably two), but not all, of the tiles making up the output frame. Each such set of tiles will then be processed in turn, with the processing of one set preferably being completed before the next set is begun.

Other arrangements would be possible, if desired. For example, because the tiles are, in effect, independent of each other, it would be possible, as noted above, to process different tiles in parallel and/or in an interleaved fashion, e.g. so as to increase the rate of parallel processing, if desired. In this case the next tile (or set of tiles) may be begun before the previous tile (set of tiles) has finished. It may also be the case, e.g., that the mechanism for the tile processing can result in the processing of tiles overlapping some of the time, e.g., where the commands for different tiles may be processed in parallel. However, even in these arrangements, it will still be the case that one or more tiles will be completed before other tiles are begun.

The rendering passes that are to be performed on each tile can be performed in any suitable and desired manner. As will be appreciated, for any application requiring "accumulation buffer" operation for a frame to be displayed, the graphics processor will typically be instructed to perform a desired sequence of rendering passes and so in the technology described herein, it is this sequence of desired (defined) rendering passes that should be performed on each tile. The rendering passes will normally, for accumulation buffer operation, render, as is known in the art, different frames, such as a given scene viewed from different viewing angles, and/or subjected to different lighting conditions, and/or jittered spatially (with its position displaced) or temporally, etc. Thus in one embodiment, the rendering passes render plural different frames, which are then accumulated to provide the output, accumulated, frame.

The rendering passes are preferably performed in the normal manner of or for the graphics processing system. Thus, preferably, for any given rendering pass, the tile will be rendered and an appropriate rendered output tile generated (which will be stored, e.g., and preferably, initially at least, in the tile buffer of the graphics processor). This will be repeated for each rendering pass in the sequence of rendering passes required (defined) for the accumulated output frame in question. As discussed above, each rendering pass can be viewed as generating a "sub-tile" of the overall, "accumulated" tile that is output.

As will be appreciated, there will need to be a mechanism whereby the results of each rendering pass for a given tile can be accumulated (i.e. to accumulate the "sub-tiles" that are generated for a given tile). This is similar to the requirements for an accumulation buffer in the traditional "accumulation buffer" arrangement, but instead of needing to be a full-frame buffer (i.e. able to store the rendering results for a whole frame simultaneously), the technology described herein will only require the rendering results for a single tile (or a set of plural tiles) to be stored simultaneously. Thus, the "accumulation buffer" in the technology described herein will only need to be a tile (or set of tiles) "accumulation" buffer (i.e. a buffer sized so as to be able to accumulate the rendering results for a tile (or for the appropriate set of tiles, where the technology processes a set of plural tiles simultaneously)).

This tile "accumulation" buffer may be provided in any suitable and desired manner. For example, it could still be provided as an external, albeit much smaller, buffer, in an analogous fashion to traditional accumulation buffer implementations.

However, in one embodiment, and as discussed above, the tile "accumulation" buffer is provided on-chip with the graphics processor (preferably internally of the graphics processor). As discussed above, this is advantageous because it can remove the need for any external memory access and bandwidth for the accumulation process. Moreover, it is a key advantage of the technology described herein that it facilitates the implementation of the accumulation process and buffer on-chip with the graphics processor itself. In this case, the graphics processor will therefore have both a "tile buffer" and an "accumulation buffer".

Thus, according to a fifth aspect, there is provided a method of operating a tile-based graphics processor, the method comprising:

the graphics processor performing a sequence of plural rendering passes on a tile for a frame to be output and accumulating the results of those rendering passes in a memory of the graphics processor; and once it has completed the sequence of rendering passes and accumulated the results of those rendering passes, outputting the accumulated results for the tile to a frame buffer.

According to a sixth aspect, there is provided a tile-based graphics processor, comprising:

a memory;

means for performing a sequence of plural rendering passes on a tile for a frame to be output and accumulating the results of those rendering passes in the memory of the graphics processor; and means for, once the sequence of rendering passes has been completed and the results of those rendering passes have been accumulated, outputting the accumulated results for the tile to a frame buffer.

As will be appreciated by those skilled in the art, these aspects of the technology described herein can and preferably do include any one or more or all of features of the technology described herein, as appropriate. Thus, for example, the multiple rendering passes and accumulation process is preferably carried out for each tile or set of plural tiles making up the accumulated output frame in turn. Similarly, the memory of the graphics processor that the results of the rendering passes are accumulated in preferably comprises a tile buffer of the graphics processor (as discussed below).

Where the tile accumulation buffer is provided on the graphics processor itself, then that could, e.g., be achieved by providing a suitable additional buffer (memory) on the graphics processor. For example, the accumulation buffer could be provided as an on-chip block that is outside of the "normal" graphics processing unit. This may be done, e.g. on new processors where it is possible to add a new buffer for this purpose.

However, in one embodiment, the tile accumulation buffer is provided on the graphic processor by using existing memory of the processor for that purpose (i.e. by using memory of the graphics processor that is and will be present anyway, e.g. because it has another, already existing function).

In one arrangement, the tile buffer that will be present in any event on the graphics processor is used as the memory to store the "tile accumulation" buffer that is to be used when implementing the technology described herein.

Thus, in one embodiment, the tile buffer of the graphics processor can be and preferably is capable of (and configured to) store both a (normal) tile buffer and an accumulation "tile" for a tile being rendered.

In these arrangements at least the technology described herein can be implemented using the existing (already needed and provided) logic of the graphics processor, i.e. at no extra cost. Similarly, these arrangements of the technology described herein at least can be implemented on existing graphics processors (since they do not require any additional logic (hardware)) and so the technology described herein is compatible with and can be implemented on existing graphics processing systems.

In these arrangements where already present memory, such as the tile-buffer(s), of the graphics processor is to be used to accumulate the results for the tiles in the process of the technology described herein, then as will be appreciated by those skilled in the art, it may be necessary to ensure there is room in the memory to accumulate the results for a tile (or set of tiles).

This may be done, where necessary, in any desired and suitable manner. For example, the amount of multi-sampling being performed could be reduced (e.g., and preferably, halved), e.g., from 4× to 2×, as that will then free up room in the, e.g., tile buffer. For example, four FP16-values will use the same amount of storage as two RGBA8888 buffers, so by reducing the amount of multi-sampling in such an arrangement from 4× to 2×, the "freed" (no-longer used) samples (the space for those samples) could be used to store the accumulation "tile". In one embodiment, this is done.

Alternatively, instead of reducing the number of multi-samples (samples stored per tile), the size of the tiles could, in effect, be reduced (e.g. and preferably, halved), so as to provide "room" in the tile buffer for the "accumulation" tile. For example, in a system that normally uses tile buffers of size 16×16 sampling points, when implementing the technology described herein, a tile size of 16×8 could instead be used. This would, in effect, divide the tile buffer for a 16×16 tile in two, with one half being a 16×8 "normal" tile buffer, and the other half being a 16×8 "accumulation" buffer for the tile. In this case the higher level of multi-sampling could, e.g., be retained (i.e. not reduced) when using the technology described herein, and a higher level of precision (e.g. 32-bit values) could be used for the accumulation buffer, but the frames would be processed using a smaller tile size.

Thus, in another embodiment, the size of the tiles that the graphics processing system operates on is reduced (as compared to the "normal" tile size it is to use (and, e.g., that its tile buffer(s) are configured to handle), preferably by half, when the technology described herein is being used.

(It should be noted here that the above (and other) processes and techniques for implementing the technology described herein need only be used when the graphics processing system is operating to process a frame in the manner of the technology described herein. The graphics processing system may otherwise operate as normal (e.g. for frames not requiring accumulation buffer operation).)

The process of accumulating the results of the rendering passes for a given tile in the technology described herein can be carried out in any suitable and desired manner.

For example, the relevant rendering pass could be completed for the whole tile to generate the appropriately rendered sub-tile (as discussed above) for that rendering pass, and then that "sub-tile", once completed, appropriated added to the "accumulation tile" (buffer). This would be similar to traditional accumulator buffer operation where the entire sub-frame is rendered and then added to the accumulator buffer in an "accumulation pass".

Thus, in one embodiment, the technology described herein does this, and uses or includes an accumulation pass stage, i.e., when it completes a rendering pass for a tile, it then adds the resulting rendered "sub-tile" to the "tile" accumulation buffer (for that tile) in an "accumulation pass".

In this case, the "accumulation pass" (the moving of the data from the rendered "sub-tile" to the "accumulation buffer") may be performed as desired, for example, and preferably, by using the tile writeback logic or a suitable shader of the graphics processor.

In another embodiment, rather than waiting for the entire rendering pass for a tile to be completed (for the entire, final "sub-tile" to be generated) before accumulating the results for that sub-tile (rendering pass), the accumulation tile (buffer) is, preferably, continuously updated as the rendering pass proceeds.

In this case, the rendering results for a tile will effectively be added to the tile accumulation buffer as the rendering pass proceeds rather than completing the rendering pass and then accumulating the resulting sub-tile at that stage. This therefore, in effect, will eliminate the need for a separate "accumulation pass" between each "sub-tile" that is rendered, which may be advantageous (e.g., it will allow the next sub-tile to be begun immediately, rather than having to wait for an accumulation pass to first complete).

This may be done as desired, but in one embodiment each time a sampling position is rendered in the rendering pass, the accumulation buffer (tile) is, if necessary, updated.

In other words, when the rendering of a (given instance of a) sampling position during the rendering pass is completed, the accumulated value for that sampling position for the rendering pass (sub-tile) in question in the accumulation buffer is, if necessary, updated, without waiting for the final value for that sampling position for the sub-tile (rendering pass) to be determined.

Preferably, the accumulation buffer is updated, if necessary, with the rendering result for each sampling position or set of sampling positions (when plural sampling positions are rendered simultaneously) every time a new rendering result for that sampling position or positions has been generated.

The Applicants have recognised that in these arrangements where the accumulation buffer is updated as the rendering is proceeding, there will be values generated for sampling points that are rendered during the rendering pass that will be replaced by later rendered values for those sampling points in the completed version of the rendered tile (in the final version of the "sub-tile" in question), for example, where due to over-draw the earlier sampling point value is in fact occluded by a later sampling value in the rendering pass.

Furthermore, one cannot simply accumulate all the intermediate rendered values for a given sampling position in the accumulation buffer, as the accumulation buffer should only in fact accumulate the "final" version of the sub-tile in question (the end result of the rendering pass) with the other sub-tiles (rendering passes).

It may not be appropriate therefore simply to accumulate each and every newly rendered value for a sampling position in the accumulation buffer in these arrangements of the technology described herein, as that may in fact result in the accumulation buffer accumulating the wrong values.

Thus, in one embodiment, the system is configured and operated to ensure that only the current value (i.e. the value currently stored in the tile buffer) of each sampling position in the sub-tile being rendered is applied to the accumulation buffer (is accumulated in the accumulation buffer).

As the tile-buffer should always hold the current version of the sub-tile that is being rendered (i.e. the version of the sub-tile that should be accumulated in the accumulation buffer at that moment in time), if one then makes sure that the accumulation buffer has accumulated (only) the "current" tile buffer's value for any given sampling position, the accumulation buffer should always be correct (for that moment in time), even if the rendering of the sub-tile has not finished yet, and will be correct when the sub-tile (rendering pass) is finished.

This should ensure that all over-draw situations for example, will be handled correctly, even through the accumulation is being performed as the "sub-tile" is being rendered, and accordingly ensure that an identical accumulation output will be produced as would be produced as if the "normal" procedure for accumulation buffers (with an accumulation pass) was being followed.

In these arrangements, the rendered sampling positions are preferably written to the tile-buffer as normal (i.e. when and if they should replace the existing tile buffer values, e.g., because they occlude the existing fragments stored for those sampling positions).

Thus the system is preferably operated to generate the tile buffer for the tile (the sub-tile) as the rendering pass proceeds in the "normal" fashion and to then ensure that it is always the current value of the tile buffer that has been applied to the accumulation buffer for a given sampling position for the rendering pass (sub-tile) in question.

This may be achieved as desired, but in one embodiment of these arrangements of the technology described herein, when a newly rendered value is to be written to a sampling position for a sub-tile that is being rendered, the present value for that sampling position in the sub-tile in question is first subtracted appropriately (i.e. with the appropriate weighting) from the accumulation buffer, and the newly rendered value is then added appropriately to the accumulation buffer. This should thereby ensure that it is only the "current" value for a sampling position in the sub-tile that is, in effect, being applied to the accumulation buffer.

In one such embodiment, it is first determined whether a newly rendered value for a sampling position does replace the existing value being used for that sampling position in the sub-tile, and the accumulation buffer is only updated with the new value if the new value does replace the existing value. (Whether a newly rendered value for a sampling position replaces the existing value for that sampling position can be determined as desired, for example, and preferably, by using a suitable depth (Z) test (comparison), as is known in the art.)

Such an arrangement may be achieved as desired, but in one embodiment is done by, when a new fragment that covers a sampling position or positions of the sub-tile being rendered exits the rendering pipeline, subtracting appropriately the existing tile buffer value for the sampling position(s) covered by the new fragment from the accumulation buffer for those sampling position(s) and then adding (accumulating) the (newly rendered) tile buffer value(s) for the sampling position(s) covered by the new fragment appropriately to the accumulation buffer for those sampling position(s).

(As is known in the art, the rendering process is typically carried out by "representing" the sampling points being processed to display the image as discrete graphical entities usually referred to as "fragments" on which the graphics rendering operations (such as shading) are carried out. Each sampling point will, in effect, be represented by a fragment that will be used to shade the sampling point in question. A fragment may represent (have associated with it) a single sampling point or plural sampling points. The "fragments" are thus the graphical entities that pass through the rendering process (the rendering pipeline).)

In another embodiment, when a sampling position is to be rendered, the current value applied to the accumulation buffer for that sampling position for the sub-tile in question is subtracted appropriately from the accumulation buffer value for that sampling position, and then, after the sampling position has been rendered, the current value for that sampling position in the tile buffer for the sub-tile (which may be the newly rendered value, where the new value replaces the old value for the sampling position, or may be the previous (existing) current value for the sampling position (where the new value does not replace the previously stored value)) is added (accumulated) appropriately to the accumulation buffer value for the sampling position in question.

Thus, in one embodiment, as a tile is being rendered (undergoing one of its rendering passes), when a fragment representing one or more sampling positions enters the rendering process (pipeline), the current tile buffer value for that fragment (for the sampling position(s) that the fragment represents) for the rendering pass in question is appropriately subtracted from the accumulation buffer value(s) for those sampling positions for the tile in question and then, when the fragment has completed its rendering, the current tile buffer value(s) for the sampling positions following the rendering of the fragment is added (accumulated) appropriately to the accumulation buffer value(s) for those sampling positions for the tile in question.

In an arrangement of these embodiments, the accumulation buffer stores fixed-point values. This may be necessary in some circumstances for this technique to work satisfactorily.

As discussed above, the set of "accumulated" output tiles generated for the tiles of the output frame should be combined to provide the overall, output accumulated frame. This is done by writing each output "accumulated" tile (which will be stored in the tile "accumulation buffer") to the, e.g., frame buffer once it is ready. Then, when all the output accumulated tiles have been written to the, e.g., frame buffer, the output frame is complete and can, e.g., and preferably, be displayed (or otherwise be output as desired).

It should be noted here that the technology described herein can be used for any suitable form of accumulated output that the graphics processor may be being used to provide. Thus, although in one embodiment it is used where the output frame is intended to form an image for display (e.g. on a screen or printer) (in which case the output frame will be stored in a frame buffer, as is known in the art), the technology described herein may also be used where the output frame is not intended for display, for example where the output frame (render target) is a texture that the graphics processor is being used to generate (e.g. in "render to texture" operation), or, indeed, where the output the graphics processor is being used to generate is any other form of data array. References to the "output frame" that is being generated by the graphics processor herein should accordingly, where the context allows, be considered to include not only a frame for display, but also other suitable render targets, such as a texture or other surface that the graphics processor is generating as its output, as appropriate.

The output, accumulated, tiles can be written to the frame buffer as desired, and may, e.g., be subject to further processing, such as downsampling, as part of this process if desired. Preferably the "normal" procedure for writing tiles to the frame buffer is used for this process.

The graphics processor may be instructed and controlled to operate in the manner of the technology described herein in any desired and suitable fashion.

As will be appreciated by those skilled in the art, operation in the manner of the technology described herein is preferably triggered by the driver (software) for the graphics processor (that will be running, e.g., on a host system or processor to which the graphics processor is coupled) sending an appropriate sequence of commands to the graphics processor, e.g., in response to a request for the display of an "accumulated frame" from an application running on the host.

In one embodiment, the sequence of commands that is used to trigger and control operation comprises, for each tile to be processed, a "begin new tile" command (which will trigger the first rendering pass for the tile in question (the generation of the first "sub-tile")), and then a sequence of "begin new sub-tile" commands, one for each remaining rendering pass that the tile is to undergo. These commands should cause the graphics processor to render an appropriate sequence of "sub-tiles" to be accumulated to provide an output "accumulated" tile, as discussed above.

In this arrangement, the "begin new tile" command preferably clears both the tile buffer to be used for the tile and the accumulation buffer to be used for the tile (as it signals the start of a new tile), but the begin new sub-tile command should only clear the tile buffer, not the accumulation buffer.

The begin new tile and begin new sub-tile commands preferably also indicate the weight to be used when accumulating the sub-tile in question to the accumulation tile. (As is known in the art, it is usual also to specify the weight to be applied to each "sub-frame" that is to contribute to the accumulated frame in the accumulation buffer process and so this will need to be accounted for in the technology described herein as well. Specifying the weight to use in the begin new tile/sub-tile commands is a convenient way to do this).

In one embodiment, the driver for the graphics processor also combines all the rendering passes (sub-frames) that are to go into the accumulation buffer into a single job for the graphics processor. This will then facilitate the performing of the rendering passes one after another for each tile (or set of tiles) in turn.

It is believed that such operation of a driver for a graphics processor may be new and advantageous in its own right.

Thus according to a seventh aspect, there is provided a method of operating a driver for a tile-based graphics processor, the method comprising:

the driver:

receiving an instruction that a frame requiring accumulation buffer operation is to be output;

combining the sub-frames that are to go into the accumulation buffer for the frame into a single job for the graphics processor;

preparing and sending to the graphics processor a sequence of commands comprising, for each tile of the frame to be output, a begin new tile command and a sequence of begin new sub-tile commands, each such command instructing the graphics processor to begin for the tile in question one of the rendering passes that is in the sequence of rendering passes required for the accumulation buffer operation for the frame.

According to an eighth aspect, there is provided a driver for a tile-based graphics processor, comprising:

means for, in response to receiving an instruction that a frame requiring accumulation buffer operation is to be output, combining the sub-frames that are to go into the accumulation buffer for the frame into a single job for the graphics processor; and means for preparing and sending to the graphics processor a sequence of commands comprising, for each tile of the frame to be output, a begin new tile command and a sequence of begin new sub-tile commands, each such command instructing the graphics processor to begin for the tile in question one of the rendering passes that is in the sequence of rendering passes required for the accumulation buffer operation for the frame.

As will be appreciated by those skilled in the art, these aspects of the technology described herein can and preferably do include any one or more or all of the features of the technology described herein, as appropriate. For example, the begin new tile/sub-tile commands are preferably of the form(s) discussed above.

Similarly, the graphics processor preferably operates in response to receiving the sequence of commands from the driver.

Indeed, it will be appreciated that in response to receiving such a sequence of commands from its driver, the graphics processor will operate to subject a tile of the output frame to the sequence of rendering passes and accumulate the results of those rendering passes accordingly. This will be done for each tile that the output frame is to be divided into.

Thus, according to a ninth aspect, there is provided a method of processing a tile of an output frame in a tile-based graphics processing system, the method comprising:

subjecting the tile to a first rendering pass of a sequence of plural rendering passes and storing the resulting rendered tile in an accumulation buffer for the tile;

subjecting the tile to a second rendering pass of the defined sequence of rendering passes and accumulating the results of that rendering pass into the accumulation buffer for the tile; and repeating this process for each remaining rendering pass in the sequence of rendering passes;

so as to generate a tile output representing the accumulated results of the plurality of rendering passes for the tile; and outputting the accumulated tile output for the tile to an output render target, preferably to a frame buffer.

According to a tenth aspect, there is provided a tile-based graphics processing system, comprising:

means for subjecting a tile for an output frame to a first rendering pass of a sequence of plural rendering passes and for storing the resulting rendered tile in an accumulation buffer for the tile;

means for subjecting the tile to a second rendering pass of the sequence of rendering passes and for accumulating the results of that rendering pass into the accumulation buffer for the tile; and means for repeating this process for each remaining rendering pass in the sequence of rendering passes;

so as to generate a tile output representing the accumulated results of the plurality of rendering passes for the tile; and means for outputting the accumulated tile output for the tile to an output render target, preferably to a frame buffer.

As will be appreciated by those skilled in the art, these aspects of the technology described herein can and preferably do include any one or more or all of the features described herein, as appropriate.

Thus, for example, the process is preferably repeated for each tile that the output frame is to be divided into.

In this case, the method or system will accordingly comprise steps of or means for processing a set of tiles making up at least part of an output frame in a tile-based graphics processing system, comprising steps of or means for:

subjecting a first tile of the set of tiles to a first rendering pass of a sequence of rendering passes and storing the resulting rendered tile in an accumulation buffer for the tile;

subjecting the first tile to a second rendering pass of the sequence of rendering passes and accumulating the results of that rendering pass into the accumulation buffer for the tile; and repeating this process for each remaining rendering pass in the sequence of rendering passes to generate a tile output representing the accumulated results of the plurality of rendering passes for the tile; and outputting the accumulated tile output for the tile to an output render target, preferably to a frame buffer; and, thereafter, subjecting a second tile of the set of tiles to the first rendering pass of the sequence of rendering passes and storing the resulting rendered tile in an accumulation buffer for the second tile;

subjecting the second tile of the sequence of tiles to the second rendering pass of the sequence of rendering passes and accumulating the results of that rendering pass into an accumulation buffer for that tile; and repeating this process for each remaining rendering pass in the sequence of rendering passes to generate a tile output representing the accumulated results of the plurality of rendering passes for the second tile; and once the accumulated results of the sequence of rendering passes for the second tile have been completed;

outputting the accumulated tile output for the second tile to the output render target, preferably to the frame buffer; and repeating this process for the remaining tiles of the set of tiles.

It should also be appreciated here that while the above discussed sequences of processing the tiles (or sets of tiles) one after another will and should essentially be followed while the output, accumulated frame is being processed, there will still be some tiles whose processing is not preceded by the processing of other tiles and some tiles whose processing is not followed by the processing of other tiles. For example, the final tile (or tiles) to be processed will not be followed by the processing of further tiles (as the output frame will then be finished). Thus, for example, the set (sequence) of tiles referred to above will comprise a set or sequence of tiles from the "middle" of the frame, and that processing sequence will not, e.g., be followed exactly for the end tiles of the output frame.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, functional units, circuitry, processing circuitry, managing circuitry, logic, processing logic, microprocessor arrangements, etc., that are operable to perform the various functions, etc., such as appropriately dedicated hardware elements and/or programmable hardware elements that can be programmed to operate in the desired manner.

In an embodiment the graphics processor is implemented as a hardware element (e.g. ASIC). Thus, in another aspect the technology described herein comprises a hardware element including the apparatus of, or operated in accordance with the method of, any one or more of the aspects of the technology described herein.

In an embodiment the graphics processor comprises a single graphics processing platform that generates and outputs the graphics data that is written to the frame buffer for the display device.

It should also be noted here that, as will be appreciated by those skilled in the art, the various functions, etc., of the technology described herein may be duplicated and/or carried out in parallel on a given processor.

The technology described herein is applicable to any form or configuration of (tile based) graphics processor and renderer, such as processors having a "pipelined" rendering arrangement (in which case the renderer will be in the form of a rendering pipeline).

As will be appreciated from the above, the technology described herein is particularly, although not exclusively, applicable to 3D graphics processors and processing devices, and accordingly extends to a 3D graphics processor and a 3D graphics processing platform including the apparatus of, or operated in accordance with the method of, any one or more of the aspects of the technology described herein. Subject to any hardware necessary to carry out the specific functions discussed above, such a 3D graphics processor can otherwise include any one or more or all of the usual functional units, etc., that 3D graphics processors include.

It will also be appreciated by those skilled in the art that all of the described aspects and embodiments of the technology described herein can include, as appropriate, any one or more or all of the features described herein.

The methods in accordance with the technology described herein may be implemented at least partially using software e.g. computer programs. It will thus be seen that when viewed from further aspects the technology described herein provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising data processing means causes in conjunction with said data processing means said processor, renderer or system to carry out the steps of the methods of the technology described herein. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad aspect the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described by way of example only and with reference to the accompanying drawings.

As discussed above, the technology described herein relates to the "accumulation buffer" process in graphics processing systems, and in particular to an innovative system and method for implementing such operation in a tile based graphics processing system.

As is known in the art, the "accumulation buffer" process essentially involves rendering plural different versions of an output frame, e.g. from several different viewing angles, and then accumulating the results as a single, output "accumulated" frame. This operation is typically used to emulate different effects such as depth of field, motion blur, soft shadows and anti-aliasing.

FIG. 1 illustrates the basic concept of the technology described herein.

FIG. 1A shows schematically a frame 1 that has been divided into multiple tiles or sub regions, 2, 3, 4 and 5, each of which tiles will, as is known in the art, be rendered separately and then combined to provide a output frame for display.

(FIG. 1A shows the frame divided into four tiles for clarity purposes. As will be appreciated by those skilled in the art, a given frame will typically be divided into many more than four tiles.)

Figure 1B:
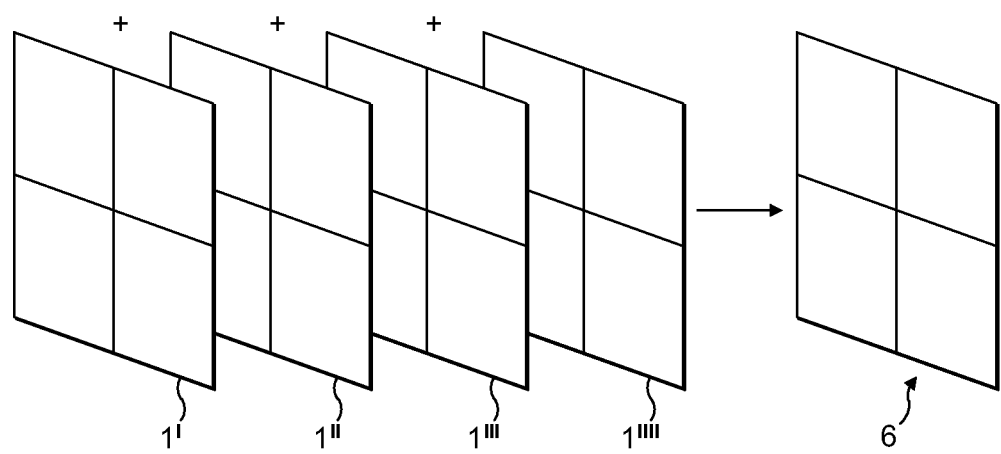

FIG. 1B shows schematically the traditional "accumulation buffer" operation as it would be applied to the frame 1 shown in FIG. 1A. Thus, as shown in FIG. 1B, as is known in the art, plural different versions 1', 1", 1''', 1'''' of the frame 1 are rendered and accumulated together to provide an output "accumulation" frame 6. In this case, and as is known in the art, a first rendering pass will generate in its entirety a first sub-frame 1' that is to contribute to the accumulated output frame 6. A second, different rendering pass will then generate a second whole sub-frame 1", which again will be accumulated into the final accumulation output frame 6, and so on.

Figure 1C:
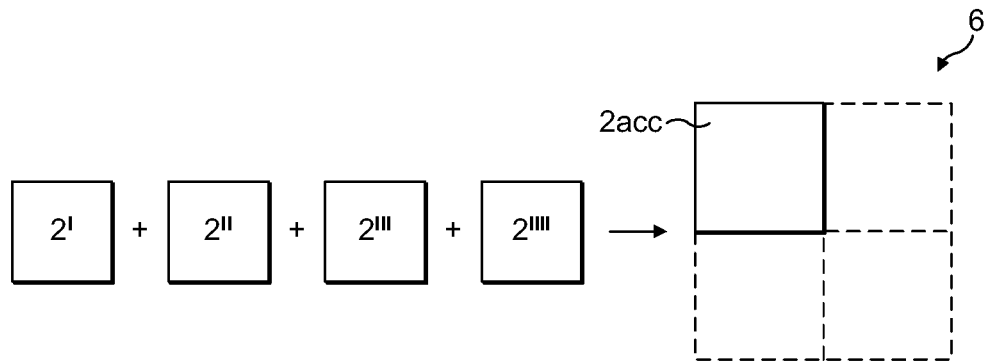
Figure 1C:
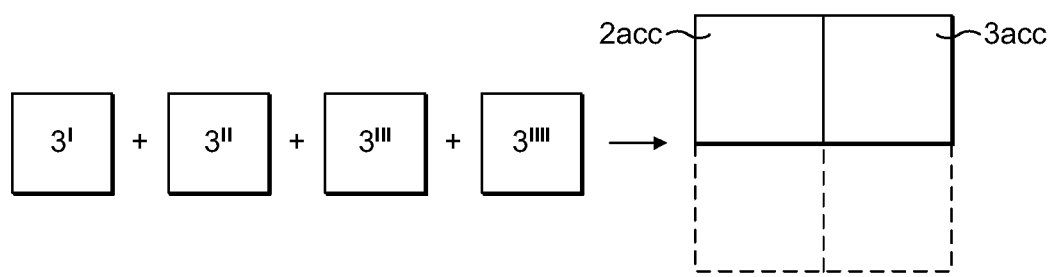
Figure 1C:
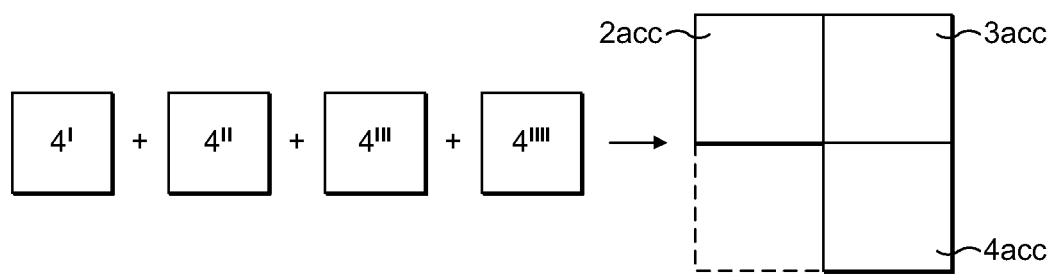
Figure 1C:
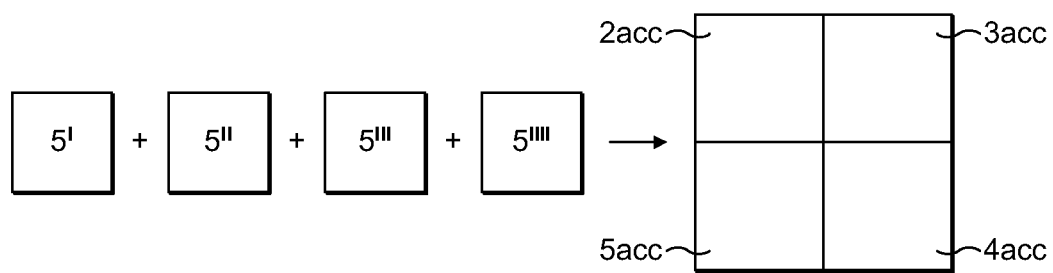

FIG. 1C shows schematically how the accumulation buffer operation to generate the accumulated frame 6 would be carried out in accordance with one embodiment. As shown in FIG. 1C, rather than rendering each sub-frame 1', 1", 1''' and 1'''' in its entirety in turn, in a system that is in accordance with one embodiment of the technology described herein each individual tile 2, 3, 4 and 5 is subjected to the different rendering passes and accumulated individually.

Thus, for example, in the case of the tile 2, the first rendering pass is carried out for that tile to generate a sub-tile 2', and then a second rendering pass is carried out for that tile to generate a second version of the tile 2", which is accumulated with the first version of the tile 2', and then a third rendering pass is carried out to generate a third version of the tile 2''', which is again accumulated with the previously rendered versions of the tile, and so on, to provide a final output accumulated version of the tile $2_{ACC}$. The accumulated output tile $2_{ACC}$ is then provided as an output to form the output tile 2 for the overall accumulated output frame 6.

This is then repeated for each of the remaining individual tiles 3, 4 and 5 making up the output frame 6, and the individual accumulated tiles $2_{ACC}$, $3_{ACC}$, $4_{ACC}$ and $5_{ACC}$ are combined together to provide the output accumulated frame 6.

Thus, if one considers the traditional accumulation buffer arrangement shown in FIG. 1B as generating several sub-frames (frames 1', 1", 1''' and 1'''') that together contribute to the final image 6 by accumulation of those several sub-frames, then the concept of the present embodiment as illustrated in FIG. 1C can analogously be considered to involve the generation, for each individual tile making up the output frame, of several sub-tiles (e.g. 2', 2", 2'" and 2"") that are accumulated together to contribute to a final accumulation tile (e.g. $2_{ACC}$) that is then the output version of the tile in question. Each such output accumulated tile is then combined to provide the overall accumulated output frame 6.

Similarly, the rendering order of the present embodiment is accordingly to render all the "sub-tiles" (to carry out and accumulate all the rendering passes) for one particular tile (or a set of plural particular tiles, as will be discussed further below), before moving on to the next tile (or set of tiles)). (In contrast to this, traditional accumulation buffer operation can be viewed as generating a sub-frame comprising all the tiles of a frame and once that sub-frame has been generated, then generating the next sub-frame comprising all the tiles of a frame, and so on.)

Looked at another way, in traditional accumulation buffer operation, the first rendering pass of the sequence of rendering passes required to generate the accumulated frame is carried out for all the tiles of a frame to generate a first sub-frame, and only once that first sub-frame has been generated, is the second rendering pass sequence carried out, again across all the tiles of a frame, to generate a second sub-frame, and so on.

In contrast to this, in the present embodiment, the first rendering pass of the sequence will be carried out for a tile, and then when it has been completed for that tile, the second rendering pass of the sequence for the accumulated output frame will be carried out for that same tile to generate a second sub-tile for that tile, without waiting for the first rendering pass to be performed for all the tiles of a frame, and so on, until all the rendering passes have been completed for the tile in question. The system will then move on to another tile of the output frame. In other words, in the present embodiment, the rendering order will be such that all the "sub-tiles" for one particular tile will be rendered without waiting for the rendering passes to be completed for other tiles of the output frame (and preferably before moving on to the next tile of the output frame).

As will be discussed in more detail, in arrangements of the present embodiment, each individual tile 2, 3, 4, 5 could be processed in turn, one after another, as shown in FIG. 1C, or, alternatively, it would be possible to process two or more of the individual tiles together, such that, for example, the tiles making up the output frame are effectively processed as plural different sets of plural tiles.

For example, for the arrangement illustrated in FIG. 1C, the pair of tiles 2, 3 could be processed simultaneously, and then, when those tiles have been finished, the pair of tiles 4 and 5 could then be processed. This said, it should be understood here that although in this arrangement the pair of tiles 2, 3 may be processed simultaneously, it is still the case that the accumulation and the multiple rendering passes are still carried out for each tile separately to the other tiles, it is just that the processing of the tiles 2 and 3 could, for example, be interleaved so as to allow the process of those tiles to be performed simultaneously.

Figure 2:
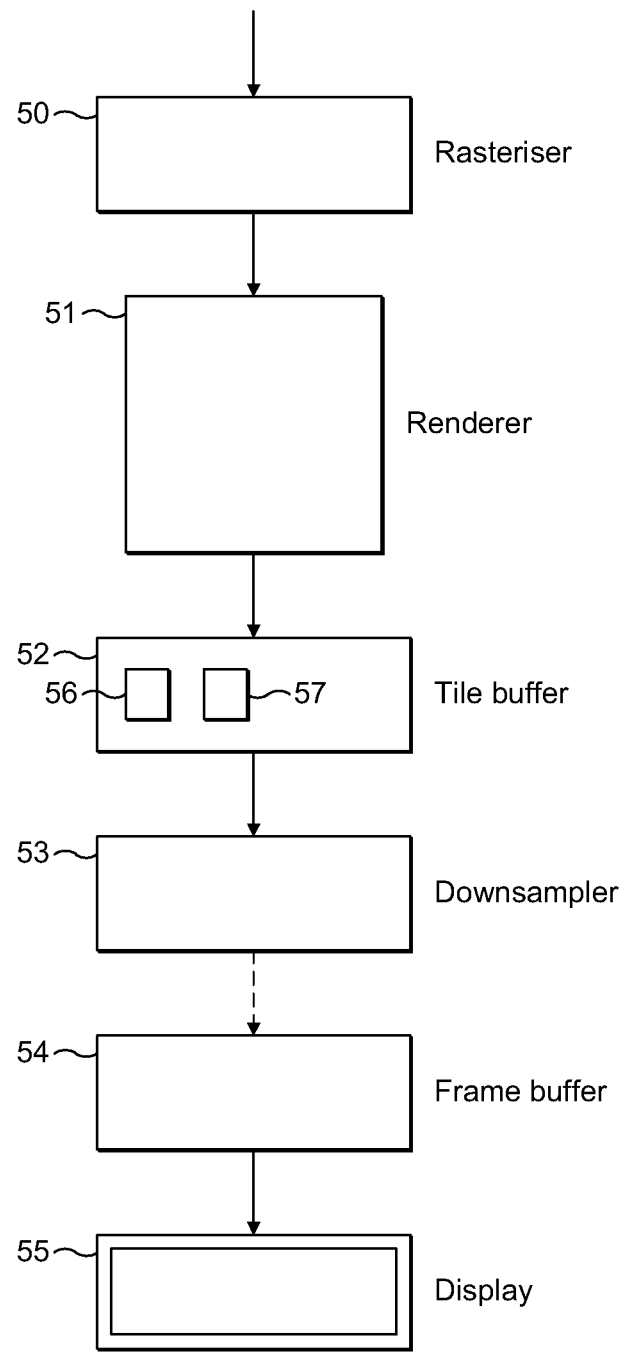
FIG. 2 shows schematically a suitable graphics processor architecture.

FIG. 2 shows schematically an embodiment of a graphics processor that can be operated in accordance with the technology described herein.

The graphics processor shown in FIG. 2 includes a rasteriser 50 that receives graphics primitives for rendering, rasterises the primitives to sampling points and generates graphics fragments having appropriate positions (representing appropriate sampling positions) for rendering the primitives, as is known in the art.

There is then a renderer 51 in the form of a rendering pipeline that receives graphics fragments for rendering from the rasteriser 50 and applies a number of rendering operations, such as texture mapping, fogging, blending, etc., to those graphics fragments to generate the appropriate fragment data, e.g., for display of the fragments. The rendered fragment data from the renderer 51 is stored in tile buffers 52 of the rendering pipeline for subsequent processing.

The tile buffers 52 store, as is known in the art, an array of fragment data that represents part of the output frame of the rendering process (e.g. of the output frame to be displayed). Once each tile has been processed, its data is exported to an appropriate storage, and the next tile is then processed, and so on, until sufficient tiles have been processed to provide the entire output frame.

In the present embodiment, the tile buffers 52 are configured, in normal operation, to store tiles that are 16×16 sampling positions in size, and to store four FP16 values for each sampling point. Other arrangements would, of course, be possible.

The tile buffers 52 may be provided as separate buffers, or may in fact all be part of the same, larger buffer. They are located on (local to) the graphics processor.

As will be discussed further below, the operation of the tile buffers 52 is modified when implementing the technology described herein.

The data from the tile buffers 52 is input to a downsampling unit 53, and thence output to a frame buffer 54 (that may not be on the graphics processor itself) of a display device 55 for display on the display device, as is known in the art. The display device 55 could comprise, e.g., a display comprising an array of pixels, such as a computer monitor, or a printer.

The downsampling unit 53 downsamples the fragment data stored in the tile buffers to the appropriate resolution for the display device 55 (i.e. such that an array of pixel data corresponding to the pixels of the display device is generated).

In the present embodiments the operation of the tile buffers 52 is modified when the graphics processor is operating in the manner of the technology described herein in order to provide the necessary "accumulation buffer" storage for a given tile as its sequence of "sub-tiles" is being accumulated.

Figure 3:
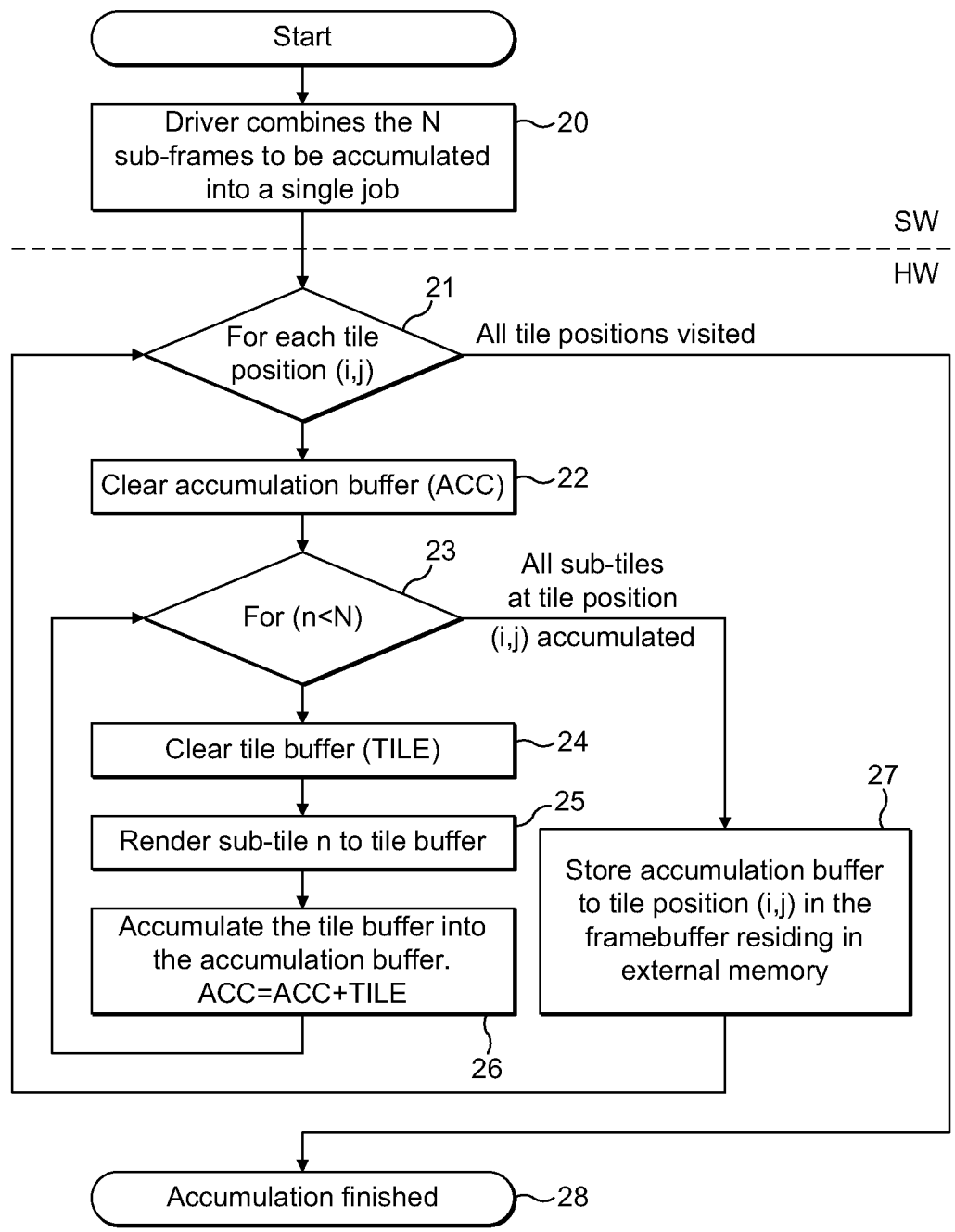
FIG. 3 shows schematically one method of implementing the technology described herein.

(As will be appreciated from the above, as, for example, the sequence of sub-tiles 2', 2", 2'" and 2"" is being processed in the manner shown in FIG. 3, the results of rendering each such "sub-tile" will need to be accumulated together as the rendering proceeds, which accumulated rendering results will then ultimately provide the output accumulation tile $2_{ACC}$. It is necessary therefore to provide an "accumulation buffer" for accumulating the sub-tiles as the rendering proceeds. This is analogous to the provision of an accumulation buffer for accumulating the results of each sub-frame as it is processed in a "traditional" accumulation buffer implementation. However, in the technology described herein the "accumulation buffer" only needs to accumulate a tile (or set of tiles) at a time, not the full frame.)

In the arrangement shown in FIG. 2, the accumulation buffer for storing the accumulated rendering results for a given tile as it is processed in the manner of the technology described herein is provided as a buffer in the tile buffers 52 of the graphics processor.

Thus, as shown in FIG. 2, for a given tile that is being processed in the manner of the technology described herein, the tile buffers 52 will be configured to provide both a "normal" tile buffer 56 for the tile being processed and an accumulation tile "accumulation buffer" 57 for that tile.

Then, and as will be discussed further below, as a tile is subject to a given rendering pass to generate a sub-tile, such as the sub-tile 2' shown in FIG. 1C, that tile will be stored in the tile buffer 56 and the resulting rendered sub-tile then accumulated into the accumulation buffer 57.

Once a given sub-tile, such as the sub-tile 2', has been completely rendered, the tile buffer 56 will then be cleared and the next sub-tile, such as the sub-tile 2", rendered into it. The resulting rendered sub-tile 2" will be accumulated into the accumulation buffer 57 (such that at that stage the accumulation buffer 57 will store the appropriately accumulated rendering results of the sub-tiles 2' and 2").

The tile buffer 56 will then be cleared and the next sub-tile, such as the sub-tile 2''', rendered, and the results of that sub-tile accumulated into the accumulation buffer 57, and so on.

Then, once all of the sub-tiles for a given tile of the output frame have been rendered and accumulated into the accumulation buffer 57, it is the content of the accumulation buffer 57 that is then output to the frame buffer 54 (via the downsampling stage 53) as the output, accumulated tile, for appropriate output or display.

At this point both the tile buffer 56 and the accumulation buffer 57 can be cleared, and then the process started for another tile of the output frame (such as the tile 3). This is then repeated for each tile of the frame to be output.

In the present embodiment, the tile buffers 52 are configured, when the graphics processor is operating in the manner of the technology described herein, to provide the accumulation buffer 57 in combination with the tile buffer 56 by reducing the amount of multisampling that is carried out as part of the rasterisation process, from 4× to 2×. Since four FP16 values (which is what a given 16×16 tile buffer would normally store for each of its data positions) will take the same amount of storage as two RGBA8888 buffers, by reducing the amount of multisampling to 2×, a given 16×16 data position four FP16 value tile buffer can be reconfigured to provide two RGBA8888 buffers, one such buffer therefore forming the tile buffer 56 and the other such buffer forming the accumulation buffer 57. This allows the necessary tile accumulation buffer 57 to be provided as part of the tile buffers, and avoids, for example, having to add a new buffer for that purpose.

Other arrangements to facilitate the provision of the accumulation buffer 57 in the tile buffers would, of course, be possible. For example, instead of reducing the number of multisamples taken from 4× to 2×, the size of the tiles being processed could instead be divided in two, to provide from one 16×16 data position tile buffer, a 16×8 tile buffer 56 and a 16×8 accumulation buffer 57. This arrangement would allow the higher number of multi-samples to be retained and, for example, higher precision values to be used for the accumulation buffer, but on the other hand would require the output frame to be processed using a smaller tile size.

It should be noted here that these arrangements allow the existing logic (i.e. tile buffers) of the graphics processor to provide the necessary tile accumulation buffer for operation in the manner of the technology described herein. Thus the tile accumulation buffer can be provided at no extra cost. Additionally, there should be considerable speed-up compared to traditional accumulation buffer architectures and a reduction in texture cache and other cache look-ups.

It would also be possible to, for example, add an additional buffer to the graphics processor or, indeed, even provide a buffer external to the graphics processor, to act as the tile accumulation buffer, although this is not so preferred.

Figure 4:
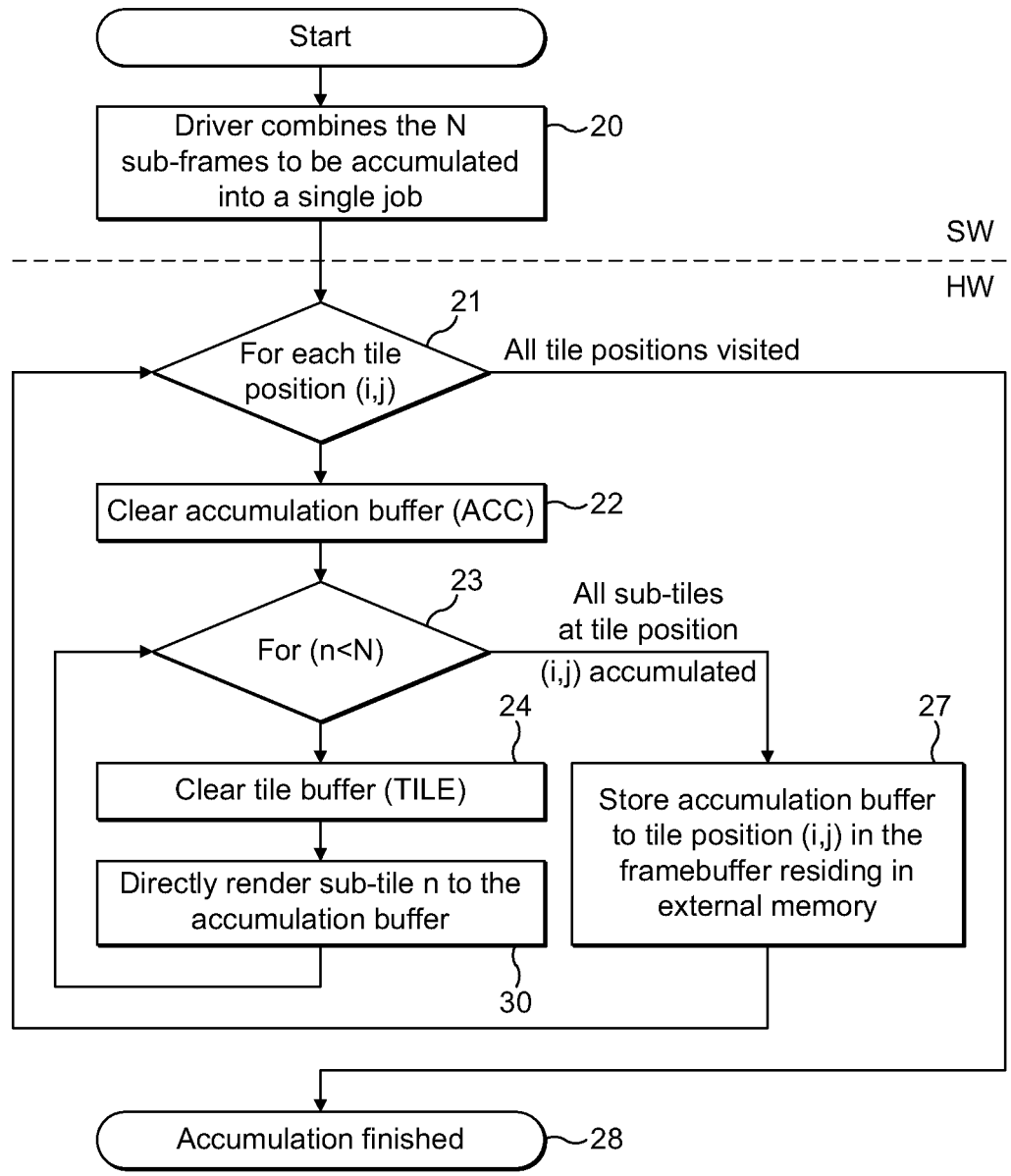
FIGS. 4 and 5 show schematically another method of implementing the technology described herein.
Figure 5:
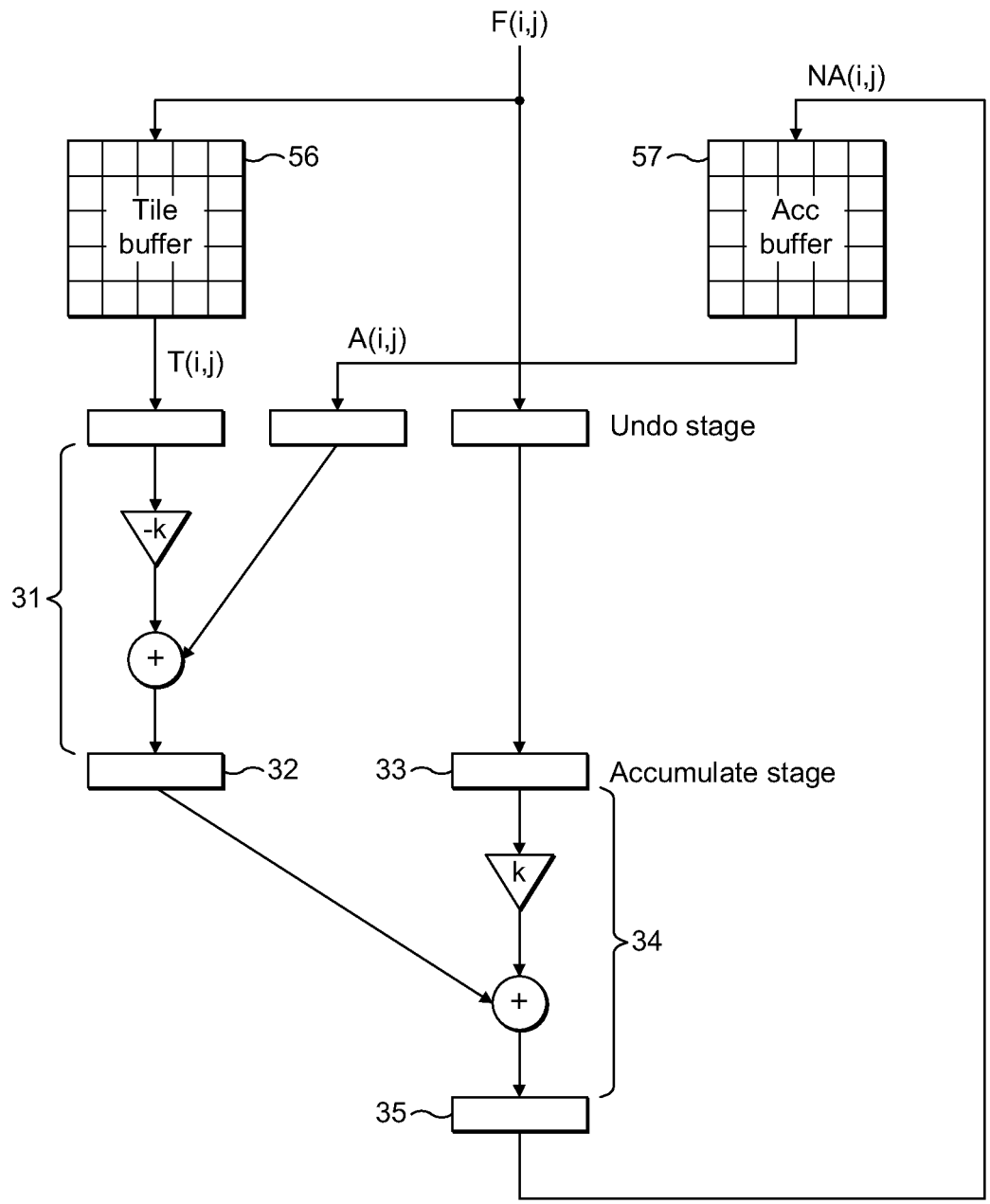

A number of embodiments for operating the graphics processor to process an output frame in the manner of the technology described herein will now be described with reference to FIGS. 3 to 5. FIG. 3 shows a first embodiment of the operation of a graphics processor in accordance with the technology described herein in which there are separate render and accumulate steps. FIGS. 4 and 5 show a second embodiment of such operation which has combined render and accumulate steps.

Like reference numerals are used for like steps in FIGS. 3 to 5.

As will be appreciated, operation of the technology described herein will first be triggered by a requirement for accumulation buffer operation, e.g. in response to the driver for the graphics processor receiving such a command from an application that requires graphics display. As is known in the art, this command will typically instruct the graphics processor to process and accumulate a series of sub-frames into the accumulation buffer, with each sub-frame having, for example, a defined rendering pass and a specified weight that denotes its contribution to the final accumulated frame.

In the present embodiments, in response to receiving such a command, the graphics processor driver first combines all the N rendering passes (sub-frames) that are to go into the accumulation buffer into a single "job" for the graphics processor (step 20). This is so as to ensure that the graphics processor does not render each sub-frame separately before combining them to a single frame, but rather can carry out each rendering pass on each tile in sequence, as discussed above. Other arrangements would, of course, be possible.

The graphics processor driver also prepares in step 20 a sequence of commands to instruct the graphics processor to operate in the manner of the technology described herein.

The sequence of commands comprises, for the first sub-tile of each tile to be processed, a "begin new tile" command, and for the other sub-tiles to be processed for the same tile, a "begin new sub-tile" command. The difference between the "begin new tile" and "begin new sub-tile" commands is that the begin new tile command will cause the graphics processor to clear the accumulation buffer 57 (i.e. to write the accumulation buffer 57 to the frame buffer 54) in addition to clearing the tile buffer 56, whereas each begin new sub-tile command will simply clear the tile buffer 56.

In the present embodiment, each tile-buffer has associated with it a "clear" bitmap to indicate which sampling positions are not rendered yet. For normal rendering operations, this clear-bitmap is reset for each new tile to be rendered. However, when applying this to the accumulation buffer operation of the present embodiment, there will, as discussed above, be plural versions of the tile rendered (the accumulation "sub-tiles") before the final version of the tile (the "accumulated" tile) is output to the frame buffer. It is therefore necessary to "clear" the "sub-tile" buffer whenever a new sub-tile is begun, and to clear the "accumulated" tile buffer whenever a new tile to be accumulated is begun.)

Each begin new tile and begin new sub-tile sub-tile command also specifies the weight to be used when accumulating that sub-tile to the "accumulation" tile.

Such a sequence of begin new tile and begin new sub-tile commands is generated for each tile of the output frame.

The driver will also, as is known in the art, prepare suitable sequences of commands (that will follow the begin new tile and begin new sub-tile commands appropriately) to cause the graphics processor to render each respective sub-tile in the appropriate manner.

FIG. 3 then shows schematically the operation of the graphics processor in response to receiving such a sequence of commands from its driver in a first embodiment of the technology described herein.

As shown in FIG. 3, the graphics processor will for each tile (step 21) (for which it will receive a "begin new tile"

command to indicate that a new tile is being started) first clear the accumulation buffer 57 (step 22) (i.e. set the clear bitmap for the "accumulated" tile).

It will then perform and accumulate the sequence of N rendering passes making up the accumulation operation on the tile (steps 23 to 26). Each subsequent rendering pass (after the first) will be indicated, as discussed above, by a begin new sub-tile command, and the next "begin new tile" command will signify the end of the current tile and the start of the next tile.

Thus, for each rendering pass n (of the sequence of N rendering passes to be performed for the accumulation buffer) (step 23), the graphics processor will first clear the tile buffer (i.e. the buffer into which the current "sub-tile" is to be written) (step 24). (The tile buffer 56 may also, as is known in the art, be initialised with a default background colour (i.e. a colour that the frame is to get in those places where no primitives are in fact rendered to the frame), if desired.) The graphics processor will then perform the rendering pass n (render the sub-tile n) and store the results in the tile buffer 56 (step 25).

Once that rendering pass has been completed (the sub-tile n has been rendered to the tile buffer 56), the graphics processor then accumulates the so-stored rendered sub-tile n in the tile buffer into the accumulation buffer 57 (step 26). This accumulation may be performed, for example, using a shader or the tile write-back logic of the graphics processor.

This accumulation step is, as will be appreciated by those skilled in the art, equivalent to the "accumulation pass" that is performed in traditional accumulation buffer operation, but is a pass that accumulates the rendered sub-tile to an "accumulation" tile, rather than a pass that accumulates the entire rendered frame into an accumulation buffer.

Where the accumulation is done by using the tile write-back logic, that can, for example, reuse the adder in the downsampling logic 53 for the accumulation. Using a shader of the graphics processor for the accumulation step could avoid, for example, the need to add logic to the graphics processor for the accumulation pass.

Once the current sub-tile (the sub-tile in question) has been accumulated into the accumulation buffer in this way, there will be a new "begin new sub-tile" command, and the steps 23, 24, 25 and 26 of clearing the tile buffer, rendering a sub-tile and, once that sub-tile has been rendered, then accumulating the resulting rendered sub-tile into the accumulation buffer, are repeated for the next sub-tile (the next rendering pass) of the sequence of rendering passes required for the accumulation buffer operation.

This is repeated until all the rendering passes in the required sequence of rendering passes for the accumulation buffer operation have been completed and the results accumulated for the tile in question (i.e. all the N sub-tiles for the tile in question have been generated and accumulated).

(In the present embodiment, as the accumulation process is carried out, a fragment dependency check ensures that all fragments associated with a particular sampling position in the tile buffer are blocked from exiting the rendering pipeline until all previous fragments for that same sampling position have exited the pipeline (this also includes fragments for the same sampling position in the previous sub-tile (or tile)). This ensures that the sampling positions for each tile are processed in the correct order.)

Once all the rendering passes in the required sequence of rendering passes for the accumulation buffer operation have been completed and the results accumulated for the tile in question, the stored accumulated tile in the accumulation buffer 57 is output to the external memory frame buffer 54 (step 27).

It should be noted here that in the above process, when the sub-tile n (the nth rendering pass for the tile) has been completed, that tile is not written back to external memory, but is instead accumulated appropriately in the accumulation buffer 57 (at step 26).

Similarly, the accumulation buffer 57 is not written back to external memory (to the frame buffer) until all the sub-tiles for the tile in question have been rendered and accumulated (at step 27).

Thus all external memory bandwidth for the accumulation buffer operation has been eliminated.

The process is then repeated for the next tile making up the output frame, and so returns to the steps 21 and 22 to clear the accumulation buffer and start the process for the next tile of the output frame. (There will be a "begin new tile" command to trigger this.)

This sequence of operation is then repeated (as shown in FIG. 3) until at step 21 it is found that all the tiles making up the output frame have been covered, at which stage the frame buffer should contain the complete accumulated output frame that can then be displayed (or otherwise output as desired). The accumulation for the frame in question will thus be finished (step 28).

FIGS. 4 and 5 show a second embodiment of the operation of the graphics processor in accordance with the technology described herein.

As can be seen from FIG. 4, the operation in the manner of the technology described herein in this embodiment is similar to the operation of the previous embodiment described above and shown in FIG. 3, save that instead of completing the rendering of the relevant sub-tile to the tile buffer and only then accumulating the sub-tile into the accumulation buffer in an accumulation pass (steps 25 and 26 in FIG. 3), in this embodiment each sub-tile is "directly" rendered into the accumulation buffer 57 as the rendering pass proceeds (step 30 in FIG. 4). This arrangement has the advantage that it therefore avoids the need for an accumulation pass once a given rendering pass (sub-tile) has been completed.

FIG. 5 shows schematically the "direct rendering" into the accumulation buffer step 30 of FIG. 4 in more detail.

(The values "k" and "−k" shown in FIG. 5 are, as will be appreciated by those skilled in the art, the appropriate weights to be applied to the rendered values when accumulating them into the accumulation buffer. The weights k can be appropriately stored and fetched by the processor when needed as desired. As discussed above, the weight information is preferably provided as part of the begin new tile and begin new sub-tile commands.)

As shown in FIG. 5, in this arrangement when rendering a given sub-tile, whenever a new fragment F (i, j) that is rendered for the sub-tile is determined to replace the existing rendered sampling position value(s) that the fragment corresponds to in the tile buffer for the sub-tile (i.e. the new fragment overwrites the existing fragment (sampling position value(s)) in the tile buffer), the newly rendered fragment (i.e. its rendered value) is stored in the tile buffer 56 for the sampling positions in question (as would normally be the case when rendering a tile). (In the present embodiment a suitable depth (Z) test arrangement is used to determine if a new fragment should overwrite the existing fragment. Other suitable mechanisms for determining if a new fragment should overwrite the existing fragment could be used if desired.)

However, rather than simply adding the new fragment's value to the existing accumulation buffer value(s) for the sampling position(s) in question, in the present embodiment the previous tile buffer value T (i, j) for that fragment position (for the sampling positions in question) (i.e. the tile buffer value(s) that are being replaced by the new fragment) are first appropriately subtracted from the current accumulation buffer value A (i, j) for the sampling position(s) in question in an undo stage 31, as shown in FIG. 5, to give a "corrected" accumulation buffer value 32 for the fragment position (for the sampling positions) in question.

Then, as shown in FIG. 5, the current fragment F (i, j) value 33 for the sampling position or positions in question is appropriately accumulated with the so-determined "corrected" accumulation buffer value(s) 32 in an accumulate stage 34 to provide the new accumulation buffer value NA (i, j) 35 for storing in the accumulation buffer for the sampling position (s) in question.

The effect of this is to remove (undo) the effect of the previous tile buffer value (i.e. the tile buffer value that is being overwritten by the newly rendered fragment) on the accumulation buffer value, before the new rendered value for the sampling position(s) that the fragment in question corresponds to is accumulated in the accumulation buffer 57.

The "undo" operation thus accounts for the possibility that some sampling positions within the sub-tile being rendered may be overwritten a number of times, yet the accumulation buffer should only accumulate the final value in the sub-tile for a given sampling position.

For example, if F1 (1,1), F2 (1,1) and F3 (1,1) represent three fragments that will be written to sampling position (1,1) of a given sub-tile, and F1 (1,1) overwrites the background colour, F2 (1,1) overwrites F1 (1,1), and F3 (1,1) overwrites F2 (1,1), then the correct value to accumulate in the accumulation buffer for this particular sampling position for the sub-tile in question should be F3 (1,1).

However, the process of the present embodiment operates by accumulating, as discussed above, each new rendered fragment (unless it is occluded by an existing fragment) to the accumulation buffer immediately. Without the undo stage 31, this would result in the accumulation buffer in this case accumulating F1 (1,1), F2 (1,1) and F3 (1,1) and the background colour value. That would give the wrong accumulation buffer value.

The undo stage 31 removes this problem by undoing (removing) the effect of previously accumulated values in the accumulation buffer 57 where those values are to be overwritten by a later value. In particular, in this example, when it is determined that F1 (1,1) will overwrite the background colour for the sampling position in question, the undo stage 31 will firstly subtract the background colour value from the accumulation buffer 57 for the position (1,1), so that at the end of the accumulation step, the accumulation buffer simply stores the value F1 for the position (1,1). Similarly, when it is determined that the value F2 (1,1) is to overwrite the current value for the sampling position (1,1), the undo stage 31 will firstly subtract the current value F1 from the accumulation buffer 57 for the position (1,1), so that the accumulate stage 34 will then result in the value F2 being stored in the accumulation buffer 57 for position (1,1), and so on.

Thus, as will be appreciated, the process shown in FIG. 5 in effect operates such that whenever a new fragment that is to overwrite an existing fragment exits the rendering process, the old tile buffer value for the appropriate sampling positions is subtracted from the accumulation buffer before the new tile buffer value following the rendering of the fragment is added to the accumulation buffer. This will therefore correctly handle all over-draw situations and produce an identical output as the normal, "accumulation pass" procedure for accumulation buffers.

Other arrangements would, of course, be possible.

In this embodiment, the accumulation buffer 57 is stored with fixed point values to facilitate the operation of this method.

Where the tile buffer is initialised to a default background colour that the frame will get where no primitives are rendered (as discussed above), then in this embodiment the accumulation buffer 57 is preferably initially set to accumulate that background default colour for all sampling positions, so as to ensure that the accumulation buffer has the appropriate value when that background value is subtracted by the undo stage 31 when the first fragment is accumulated into the accumulation buffer 57 for any given sampling position.

It can be seen from the above that in this arrangement, as each fragment completes it rendering, it is written to the tile buffer 56 as normal, but instead of waiting for all the fragments of the tile to complete rendering (i.e. for the sub-tile in question to be completely rendered) before the accumulation buffer 57 is updated, the accumulation buffer 57 is updated immediately a new fragment for a tile is to be added to the tile buffer. This accordingly eliminates the need for an accumulation pass between each sub-tile, thereby increasing the performance.

As will be appreciated by those skilled in the art, various modifications could be made to the technology described herein, and other arrangements of the technology described herein could be used if desired. For example, instead of rendering all the sub-tiles in order for a given tile before moving on to the next tile of the frame, it will be possible, for example where the structure of the tile buffers permits, to interleave the processing of sub-tiles for two (or more) different tiles before moving on to the next set of two (or more) tiles, if desired. This may be more efficient, for example, where the accumulation process is carried out as shown in FIG. 3 and by moving the data from the tile buffer to the tile accumulation buffer via the tile write-back unit.

Similarly, as the individual tiles are all independent of each other, they can be processed independently of each other, and so can, for example, be processed in parallel or interleaved between, if desired.

Equally, where, for example, the tile processing processes commands from a command-list in order, and each command takes some time to complete, but processing new commands begins immediately after processing of a previous command was started (such that several commands can be processed (and typically will be) processed in parallel), and blocks of commands for each tile are queued for processing after each other, then in this case since the commands can be and will be processed in parallel, there may in such an arrangement be times when commands from different tiles are being processed simultaneously (i.e. when two or more tiles are being processed simultaneously).

However, it should be noted that even where there is such simultaneous and/or parallel processing of more than one tile, it will still be the case that the processing of some tiles will be completed before other tiles are begun.

As can be seen from the above, the technology described herein, in its embodiments at least, removes the need to provide a full-frame accumulation buffer when accumulation buffer operation is required. This can greatly reduce therefore the (external) memory bandwidth when performing accumulation buffer operation, and, accordingly, provide a significant increase in rendering speed compared to traditional accumulation buffer operation.

It also facilitates, inter alia, a much lower power usage due to the significant bandwidth reduction that the technology described herein can provide, thereby, for example, facilitating accumulation buffer operation in lower-powered, such as portable and embedded graphics systems and devices.

This is achieved, in the embodiments of the technology described herein at least, by carrying out the accumulation process on a tile-by-tile basis, rather than across the frame as a whole. Moreover, the accumulation buffer can be implemented internally of the graphics processor and, preferably, using the existing tile buffers of the graphics processor. Embodiments further perform the accumulation process as the rendering proceeds, thereby eliminating the need for a separate accumulation pass.

This allows, in embodiments of the technology described herein at least, the existing logic of a tile-based graphics processing system to be used to provide accumulation buffer operation at no extra cost, and to, in embodiments of the technology described herein at least, provide a considerable speed-up compared to traditional renderers together with a reduction in texture cache and other cache look-ups.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the technology described herein and its practical application to thereby enable others skilled in the art to best utilize the invention in various embodiments and with various modifications as are suited to the particular use contemplated. It is intended that the scope of the invention be defined by the claims appended hereto.

We claim:

1. A method of providing the accumulated results of several rendering passes for at least one tile of a frame into an output frame in a tile-based graphics processing system, the method comprising:
performing a set of several rendering passes for a tile that is a division of the output frame,
wherein said tile is represented by a set of sampling positions and each rendering pass determines and writes a set of one or more values to each sampling position of the tile, each sampling position having a final value at the end of each rendering pass;
accumulating the results of the set of rendering passes for the tile in an accumulation buffer, so as to generate for the tile an output tile that comprises the accumulated results of the set of rendering passes for the tile,
wherein the accumulation buffer stores, for each sampling position, an accumulated value for the set of several rendering passes, and once all of the rendering passes and the accumulation of the results of those rendering passes is completed for the tile, the accumulated value for a sampling position is an accumulation of the final values for the sampling position from each of the rendering passes; and
outputting the so-generated output tile to the output frame; and
said method further comprising:
for each rendering pass for the tile, accumulating the rendering results for the rendering pass for the tile in the accumulation buffer as the rendering pass proceeds by:
when a new value is to be written to a sampling position of the tile during the rendering pass, updating the accumulated value for the set of rendering passes for that sampling position in the accumulation buffer using the new value for that sampling position, without waiting for the final value for that sampling position for the rendering pass to be determined.

2. The method of claim 1, further comprising:
performing for a first set of at least one tile of plural tiles of a frame to be output a plurality of rendering passes on each tile of the set individually and accumulating the results of those rendering passes for each respective tile to provide for each tile of the set of tiles a tile output representing the accumulated results of the plurality of rendering passes for the tile; and
outputting the accumulated tile output for each tile of the set of tiles to a render target; and
thereafter:
performing for a second set of at least one tile of plural tiles of the frame to be output the plurality of rendering passes on each tile of the set individually and accumulating the results of those rendering passes for each respective tile to provide for each tile of the second set of tiles a tile output representing the accumulated results of the plurality of rendering passes for the tile; and
outputting the accumulated tile output for each tile of the second set of tiles to the render target.

3. The method of claim 2, further comprising:
repeating the process of claim 2 for remaining tiles of the output frame, wherein an output frame comprising the accumulated results of several rendering passes for the output frame is generated by performing the several rendering passes and accumulating the results of those rendering passes on a tile-by-tile basis.

4. The method of claim 1, wherein plural tiles are processed singly, in turn.

5. The method of claim 1, wherein plural tiles undergo the rendering and accumulation process simultaneously.

6. The method of claim 1, comprising accumulating the results of the rendering passes for a tile in a tile buffer that is provided on-chip with a graphics processor of the graphics processing system.

7. The method of claim 1, further comprising:
determining whether a previously accumulated value in the accumulation buffer is to be overwritten by a later value; and
removing an effect of the previously accumulated value in the accumulation buffer in an undo stage if the previously accumulated value in the accumulation buffer is determined to be overwritten by a later value.

8. The method of claim 1, wherein the graphics processing system comprises a graphics processor and a driver for the graphics processor that sends to the graphics processor commands to be executed by the graphics processor; and the method further comprises:
the driver:
receiving an instruction that a frame requiring accumulation buffer operation is to be output;
combining the set of rendering passes that are to go into the accumulation buffer into a single job for the graphics processor; and
preparing and sending to the graphics processor a sequence of commands comprising, for each tile requiring accumulation buffer operation, a begin new tile command and a sequence of begin new sub tile commands, each such begin new sub tile command instructing the graphics processor to begin for the tile in question one of the rendering passes that is in the set of rendering passes required for the accumulation buffer operation for the frame.

9. A method of operating a driver for a tile based graphics processor, the method comprising:
receiving an instruction that a frame requiring accumulation buffer operation is to be output, where the accumulation buffer operation includes:
performing a set of several rendering passes for a tile that is a division of the output frame, wherein said tile is represented by a set of sampling positions and each rendering pass determines and writes a set of one or more values to each sampling position of the tile, each sampling position having a final value at the end of each rendering pass;
accumulating the results of the set of rendering passes for the tile in an accumulation buffer, so as to generate for the tile an output tile that comprises the accumulated results of the set of rendering passes for the tile, wherein the accumulation buffer stores, for each sampling position, an accumulated value for the set of several rendering passes, and once all of the rendering passes and the accumulation of the results of those rendering passes is completed for the tile, the accumulated value for a sampling position is an accumulation of the final values for the sampling position from each of the rendering passes; and
providing the accumulated results of several rendering passes for at least one tile of the frame into an output frame;
combining the set of rendering passes whose results are to be accumulated for the at least one tile of the frame into a single job for the graphics processor; and
preparing and sending to the graphics processor a sequence of commands comprising, for each tile requiring accumulation buffer operation, a begin new tile command and a sequence of begin new sub tile commands, each such begin new sub tile command instructing the graphics processor to begin for the tile in question one of the rendering passes that is in the sequence of rendering passes required for the accumulation buffer operation for the frame, wherein at least one of said begin new sub-tile commands instructs the graphics processor to accumulate the rendering results for the rendering pass in question for the tile in an accumulation buffer as the rendering pass proceeds by, when a new value is to be written to a sampling position of the tile during the rendering pass, updating the accumulated value for the set of rendering passes for that sampling position in the accumulation buffer using the new value for that sampling position, without waiting for the final value for that sampling position for the rendering pass to be determined.

10. A tile-based graphics processing system comprising:
a graphics processor that:
performs a set of several rendering passes for a tile that is a division of the output frame, wherein said tile is represented by a set of sampling positions and each rendering pass determines and writes a set of one or more values to each sampling position of the tile, each sampling position having a final value at the end of each rendering pass;
accumulates the results of those rendering passes for the tile so as to generate for the tile an output tile that comprises the accumulated results of the set of rendering passes for the tile,
outputs the so-generated output tile comprising the accumulated results of the several rendering passes for the tile to an output frame in an output buffer; and
an accumulation buffer in which the accumulated results of the rendering passes for the tile are stored, wherein the accumulation buffer stores, for each sampling position, an accumulated value for the set of several rendering passes, and once all of the rendering passes and the accumulation of the results of those rendering passes is completed for the tile, the accumulated value for a sampling position is an accumulation of the final values for the sampling position from each of the rendering passes;
wherein:
the graphics processor accumulates the rendering results for a rendering pass in question for the tile in an accumulation buffer as the rendering pass proceeds by, when a new value is to be written to a sampling position of the tile during the rendering pass, updating the accumulated value for the set of rendering passes for that sampling position in the accumulation buffer using the new value for that sampling position, without waiting for the final value for that sampling position for the rendering pass to be determined.

11. The tile-based graphics processing system of claim 10, wherein:
the graphics processor:
performs for a first set of at least one tile of plural tiles of a frame to be output a plurality of rendering passes on each tile of the set individually and accumulates the results of those rendering passes for each respective tile to provide for each tile of the set of tiles a tile output representing the accumulated results of the plurality of rendering passes for the tile; and
outputs the accumulated tile output for each tile of the set of tiles to a render target; and
thereafter:
performs for a second set of at least one tile of plural tiles of the frame to be output the plurality of rendering passes on each tile of the set individually and accumulates the results of those rendering passes for each respective tile to provide for each tile of the second set of tiles a tile output representing the accumulated results of the plurality of rendering passes for the tile; and
outputs the accumulated tile output for each tile of the second set of tiles to the render target.

12. The system of claim 11, wherein the graphics processor repeats the process of claim 11 for remaining tiles of the output frame;
whereby:
an output frame for display comprising the accumulated results of several rendering passes for the output frame is generated by performing the several rendering passes and accumulating the results of those rendering passes on a tile-by-tile basis.

13. The system of claim 10, wherein plural tiles are processed singly, in turn.

14. The system of claim 10, wherein plural tiles undergo the rendering and accumulation process simultaneously.

15. The system of claim 10, comprising a tile buffer that is provided on-chip with the graphics processor of the graphics processing system for accumulating the results of the rendering passes for a tile.

16. The system of claim 10, wherein the graphics processor determines whether a previously accumulated value in the accumulation buffer is to be overwritten by a later value, and wherein the graphics processor removes an effect of the previously accumulated value in the accumulation buffer in an undo stage if the previously accumulated value is determined to be overwritten by a later value.

17. The system of claim 10, wherein the graphics processing system comprises:
a graphics processor; and
a driver for the graphics processor that sends to the graphics processor commands to be executed by the graphics processor that:
receives an instruction that a frame requiring accumulation buffer operation is to be output;
combines the rendering passes that are to go into the accumulation buffer into a single job for the graphics processor; and
prepares and sends to the graphics processor a sequence of commands comprising, for each tile requiring accumulation buffer operation, a begin new tile command and a sequence of begin new sub tile commands, each such begin new sub tile command instructing the graphics processor to begin for the tile in question one of the rendering passes that is in the set of rendering passes required for the accumulation buffer operation for the frame.

18. One or more non-transitory computer readable storage devices having computer readable code embodied on the computer readable storage devices for programming one or more data processors, the computer readable code includes a driver for a tile based graphics processor; wherein said driver is configured to:
receive and instruction that a frame requiring accumulation buffer operation is to be output, where the accumulation buffer operation includes:
performing a set of several rendering passes for a tile that is a division of the output frame, wherein said tile is represented by a set of sampling positions and each rendering pass determines and writes a set of one or more values to each sampling position of the tile, each sampling position having a final value at the end of each rendering pass;
accumulating the results of the set of rendering passes for the tile in an accumulation buffer, so as to generate for the tile an output tile that comprises the accumulated results of the set of rendering passes for the tile, wherein the accumulation buffer stores, for each sampling position, an accumulated value for the set of several rendering passes, and once all of the rendering passes and the accumulation of the results of those rendering passes is completed for the tile, the accumulated value for a sampling position is an accumulation of the final values for the sampling position from each of the rendering passes; and
providing the accumulated results of several rendering passes for at least one tile of the frame into an output frame; and
in response to receiving an instruction that a frame requiring accumulation buffer operation is to be displayed:
combine the rendering passes whose results are to be accumulated for the at least one tile of the frame into a single job for the graphics processor; and
prepare and send to the graphics processor a sequence of commands comprising, for each tile requiring accumulation buffer operation, a begin new tile command and a sequence of begin new sub tile commands, each such command instructing the graphics processor to begin for the tile in question one of the rendering passes that is in the sequence of rendering passes required for the accumulation buffer operation for the frame, wherein at least one of said begin new tile commands or at least one of said begin new sub-tile commands instructs the graphics processor to:
accumulate the rendering results for the rendering pass in question for the tile in an accumulation buffer as the rendering pass proceeds by, when a new value is to be written to a sampling position of the tile during the rendering pass, updating the accumulated value for the set of rendering passes for that sampling position in the accumulation buffer using the new value for that sampling position, without waiting for the final value for that sampling position for the rendering pass to be determined.

19. One or more non-transitory computer readable storage devices having computer readable code embodied on the computer readable storage devices for programming one or more data processors to perform a method of providing the accumulated results of several rendering passes for at least one tile of a frame into an output frame in a tile-based graphics processing system, the method comprising:
performing a set of several rendering passes for a tile that is a division of the output frame,
wherein said tile is represented by a set of sampling positions and each rendering pass determines and writes a set of one or more values to each sampling position of the tile, each sampling position having a final value at the end of each rendering pass;
accumulating the results of the set of rendering passes for the tile in an accumulation buffer, so as to generate for the tile an output tile that comprises the accumulated results of the set of rendering passes for the tile, wherein the accumulation buffer stores, for each sampling position, an accumulated value for the set of several rendering passes, and once all of the rendering passes and the accumulation of the results of those rendering passes is completed for the tile, the accumulated value for a sampling position is an accumulation of the final values for the sampling position from each of the rendering passes; and
outputting the so-generated output tile to the output frame; said method further comprising:
for each rendering pass for the tile, accumulating the rendering results for the rendering pass for the tile in the accumulation buffer as the rendering pass proceeds by:
when a new value is to be written to a sampling position of the tile during the rendering pass, updating the accumulated value for the set of rendering passes for that sampling position in the accumulation buffer using the new value for that sampling position, without waiting for the final value for that sampling position for the rendering pass to be determined.

20. One or more non-transitory computer readable storage devices having computer readable code embodied on the computer readable storage devices for programming one or more data processors to perform a method of controlling a tile based graphics processor, the method comprising:
receiving an instruction that a frame requiring accumulation buffer operation is to be output, where the accumulation buffer operation includes:
performing a set of several rendering passes for a tile that is a division of the output frame, wherein said tile is represented by a set of sampling positions and each rendering pass determines and writes a set of one or more values to each sampling position of the tile, each sampling position having a final value at the end of each rendering pass;
accumulating the results of the set of rendering passes for the tile in an accumulation buffer, so as to generate for the tile an output tile that comprises the accumulated results of the set of rendering passes for the tile, wherein the accumulation buffer stores, for each sampling position, an accumulated value for the set of several rendering passes, and once all of the rendering passes and the accumulation of the results of those rendering passes is completed for the tile, the accumulated value for a sampling position is an accumulation of the final values for the sampling position from each of the rendering passes; and providing the accumulated results of several rendering passes for at least one tile of the frame into an output frame;

combining the set of rendering passes whose results are to be accumulated for the at least one tile of the frame into a single job for the graphics processor; and preparing and sending to the graphics processor a sequence of commands comprising, for each tile requiring accumulation buffer operation, a begin new tile command and a sequence of begin new sub tile commands, each such begin new sub tile command instructing the graphics processor to begin for the tile in question one of the rendering passes that is in the sequence of rendering passes required for the accumulation buffer operation for the frame, wherein at least one of said begin new sub-tile commands instructs the graphics processor to:

accumulate the rendering results for the rendering pass in question for the tile in an accumulation buffer as the rendering pass proceeds by, when a new value is to be written to a sampling position of the tile during the rendering pass, updating the accumulated value for the set of rendering passes for that sampling position in the accumulation buffer using the new value for that sampling position, without waiting for the final value for that sampling position for the rendering pass to be determined.

* * * * *